United States Patent [19]

Soga

[11] Patent Number: 4,851,936
[45] Date of Patent: Jul. 25, 1989

[54] ERASING METHOD FOR ERASING INFORMATION CORRECTED ON A MAGNETIC RECORDING MEDIUM

[75] Inventor: Takashi Soga, Tokyo, Japan

[73] Assignee: Fuji Photo Film Co., Ltd., Kanagawa, Japan

[21] Appl. No.: 85,648

[22] Filed: Aug. 14, 1987

[30] Foreign Application Priority Data

Aug. 15, 1986 [JP] Japan .................................. 61/190609
Sep. 3, 1986 [JP] Japan .................................. 61/205774

[51] Int. Cl.$^4$ ............................................. G11B 5/024
[52] U.S. Cl. .................................... 360/66; 360/33.1; 358/335
[58] Field of Search .................. 360/66, 33.1; 358/335

[56] References Cited

U.S. PATENT DOCUMENTS

| | | | |
|---|---|---|---|
| 2,657,277 | 10/1953 | Brastad | 360/118 |
| 4,005,482 | 1/1977 | Castro et al. | 360/66 |
| 4,376,292 | 3/1983 | Mignolet | 360/66 |
| 4,670,799 | 6/1987 | Ogura et al. | 360/66 |
| 4,717,975 | 1/1988 | Ogura et al. | 360/66 |
| 4,725,902 | 2/1988 | Oda et al. | 360/66 |

Primary Examiner—Vincent P. Canney
Assistant Examiner—Kevin J. Fournier
Attorney, Agent, or Firm—Birch, Stewart, Kolasch & Birch

[57] ABSTRACT

An erasing method is used for erasing a video signal written on a track of a rotary magnetic recording medium such as a floppy disk in which the track to be erased is scanned by a magnetic head used for recording. An erasing current having a gradually decreasing amplitude level is applied to the magnetic head. The initial amplitude level of the erasing current is greater than the optimum recording current level for the magnetic head.

2 Claims, 17 Drawing Sheets

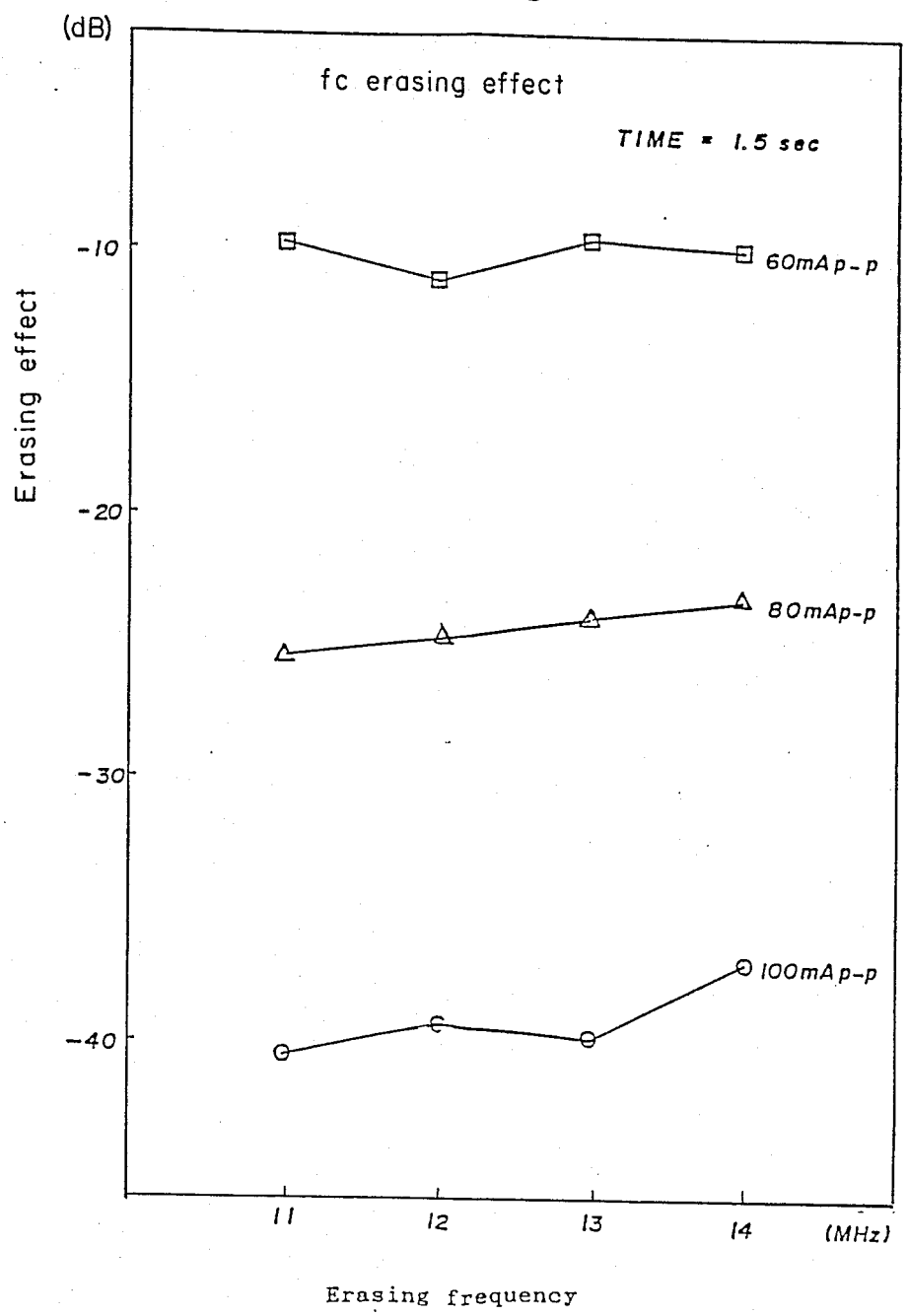

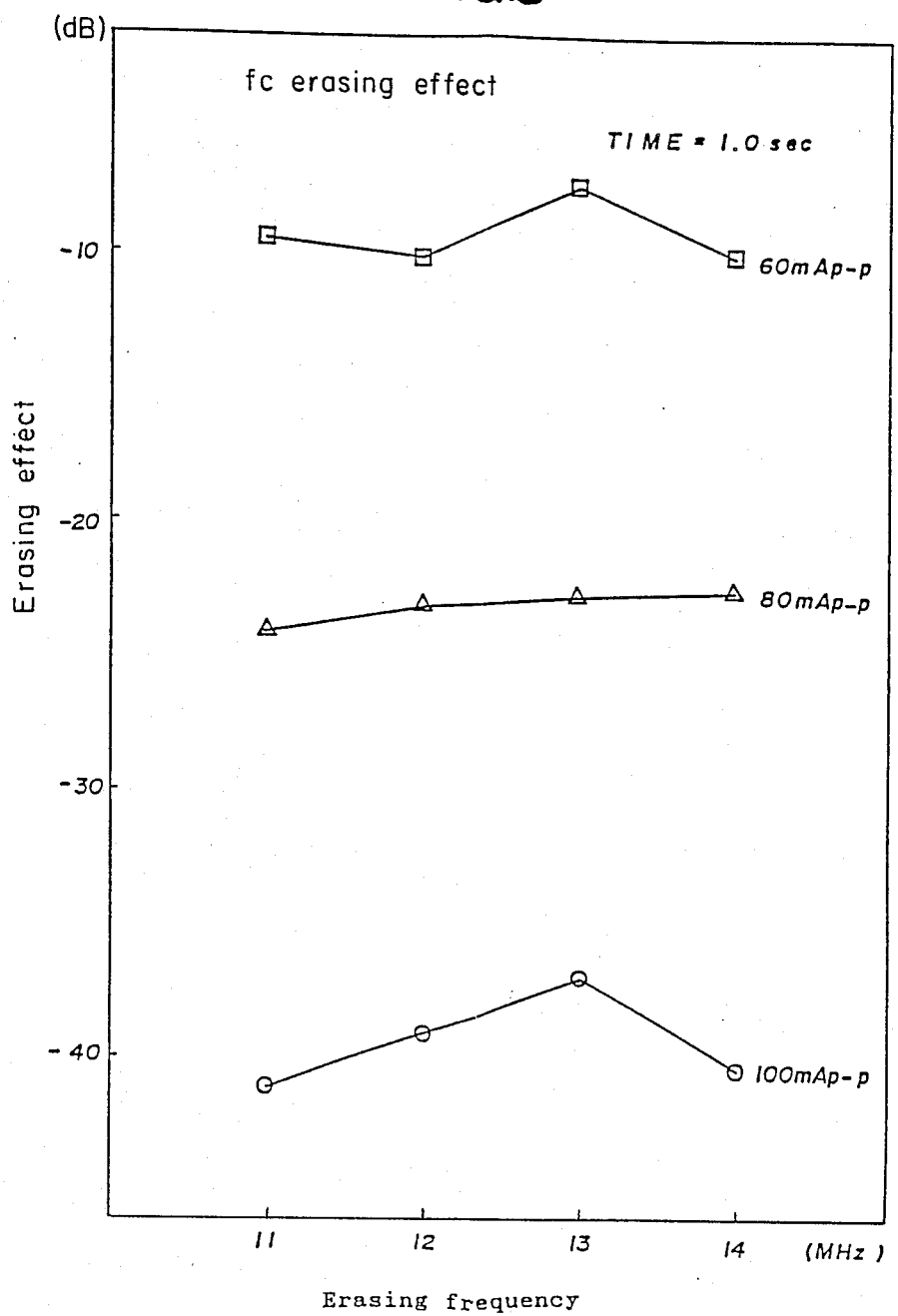

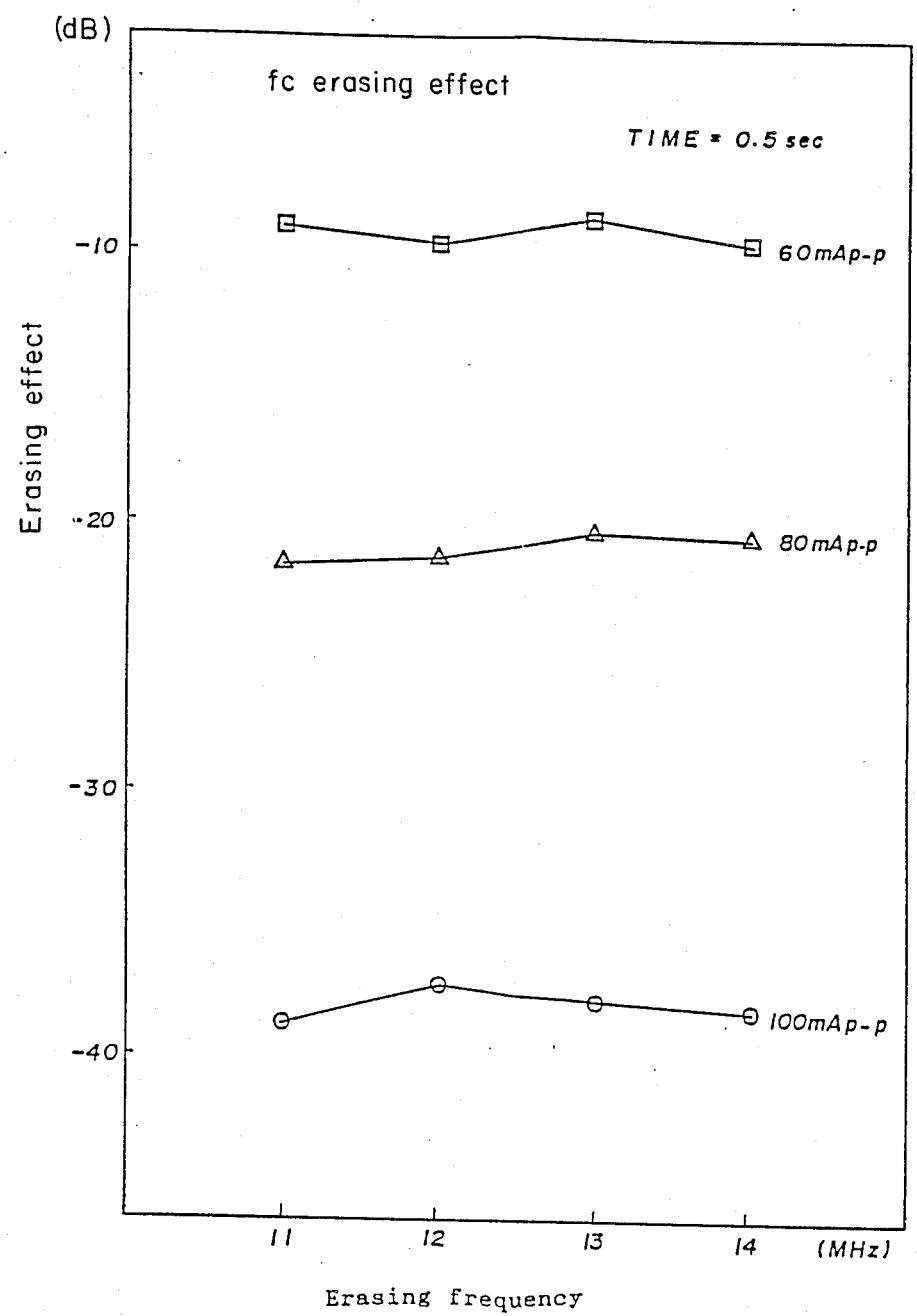

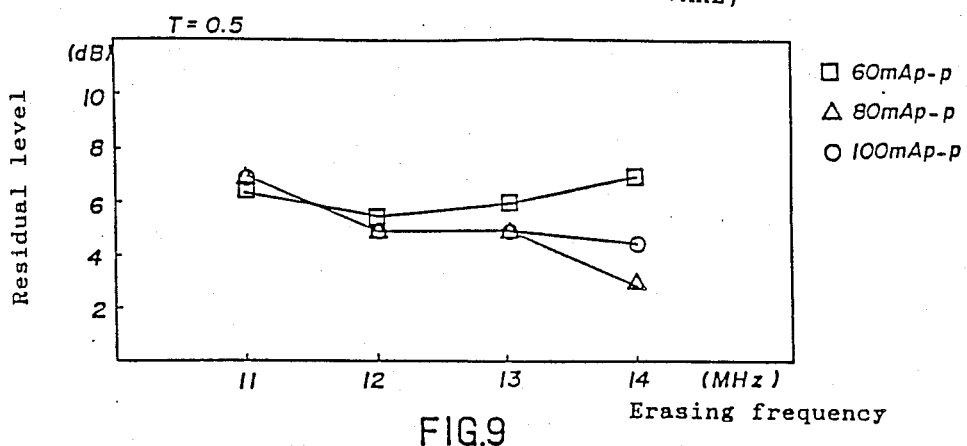
FIG.8 Residual levels other than for single spectrum (near 7MHz)
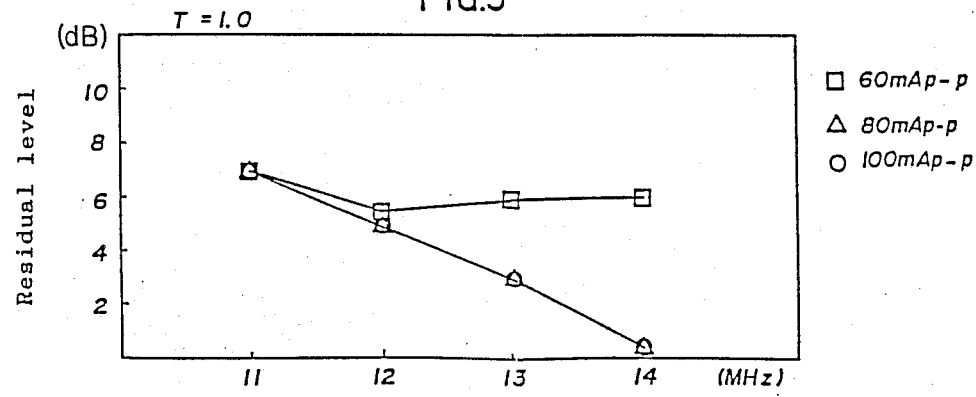
FIG.9
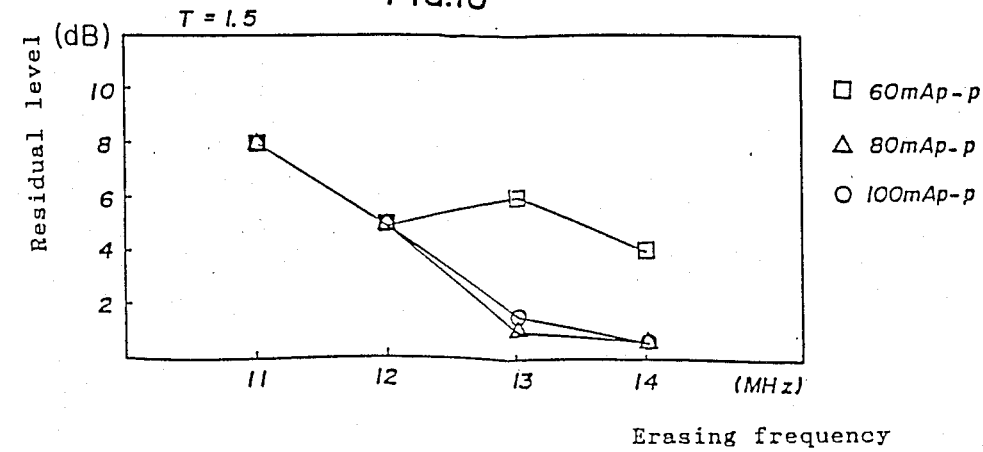
FIG.10

ERASING METHOD FOR ERASING INFORMATION CORRECTED ON A MAGNETIC RECORDING MEDIUM

BACKGROUND OF THE INVENTION

The present invention relates to an erasing method used in magnetic recording, which can provide rapid and positive erasing without leaving an erasing signal within the video signal frequency band.

There have been proposed a variety of techniques as single-track erasing methods in magnetic recording for video signals, especially in an electronic still camera which uses a floppy disk as a magnetic recording medium. One of these methods is a sweep erasing method. In the sweep erasing method, a track of a magnetic recording medium, for example, a magnetic disk, which has been already written on with a video signal, is first written on with an erasing signal of a frequency within the video signal frequency band (for example, 6 MHz. Then the writing is repeated while continuously increasing the frequency of the erasing signal so that it is finally out of the video signal frequency band. Since the frequency of the erasing signal written on the track by the sweep erasing method is out of the video signal frequency band, the recorded erasing signal can be easily cut off by a filter at reproduction so that only the necessary video signal can be reproduced. Thus, the originally recorded video signal is substantially erased by overwriting the track containing the original video signal with a number of erasing signals of different frequencies. In this case, the video signal recorded in the deep layer of the magnetic recording medium is erased by the erasing signals of relatively lower frequencies, and the video signal recorded in the surface layer is erased by the erasing signals of relatively higher frequencies.

The prior art sweep erasing method, however, has a problem in that if the erasing time is reduced (for example, less than 2 seconds), the erasing signals remain unerased within the video signal frequency band, with a higher noise level than a method which uses a bulk eraser for erasing.

SUMMARY OF THE INVENTION

To obviate all of the prior art defects of erasing methods, it is a primary object of the present invention to provide an erasing method in magnetic recording, which does not leave residual magnetism within the video signal frequency band and can reduce the noise level over the entire frequency band after accomplishing the erasing process in a short time interval to a level comparable to that for erasing by the bulk erasing method.

In accordance with the present invention which attains the above objective, there is provided a first erasing method for erasing a video signal written by a magnetic head on a track of a rotary magnetic recording medium. The track to be erased is scanned by the magnetic head. The magnetic head is applied with an erasing current having a frequency higher than the recording frequency band of the video signal, and this erasing current is gradually dampened an initial amplitude level which is greater than an optimum recoding current level for the magnetic head.

When using the first erasing method, according to the present invention, the video signal is erased by the erasing signal, which itself almost disappears from the recording frequency band.

There is also provided a second erasing method according to the present invention for erasing a video signal on a track of a rotary magnetic recording medium written by a magnetic head. The track to be erased is scanned by the magnetic head. The magnetic head is applied with an erasing current having a frequency higher than the recording frequency band of the video signal and a constant amplitude level greater than an optimum recording current level during an initial period. After the initial period the constant amplitude level is followed by a step of damping at a high rate, and further followed by a step of damping at a low rate to zero. The low-rate damping period is longer than the high-rate damping period.

When using the second erasing method, according to the present invention, the original video signal is rewritten by using the erasing signal when the erasing current is at the constant amplitude. When the erasing current rapidly decreases, the erasing signal is recorded onto the recording medium from the surface layer to the deep layer of the magnetic material with shifted phases. When the erasing current gradually decreases, the erasing signal is recorded onto the recording medium in the vicinity of the surface layer of the magnetic material more than in the deep layer with phases shifted in the depthwise direction.

There is further provided a third erasing method according to the present invention for erasing a video signal on a track of a rotary magnetic recording medium written by a magnetic head. The track to be erased is scanned by the magnetic head. The magnetic head is applied with an erasing current having a frequency higher than the recording frequency band of the video signal. The erasing current has a constant amplitude level of approximately 1.25 or more times an optimum recording level for the video floppy disk for an initial period. The initial period is a length of time required for a point on the track to pass 3 times or more relatively by a gap of the magnetic head. The erasing current is then gradually decreased from an amplitude level, corresponding to a level where the recording current - reproduction output response of the magnetic head at the erasing frequency begins to saturate, to zero for a second period following the initial period. The second period is a length of time required for a point on the track to pass 30 times or more relatively by the gap of the magnetic head.

BRIEF DESCRIPTION OF THE DRAWINGS

FIG. 5 through FIG. 7 are graphics showing data of the erasing rates of color signals when using the first erasing method according to the present invention;

FIG. 8 through FIG. 10 are graphics showing data of the residual levels for other frequencies not included in the single spectrum by the first erasing method according to the present invention;

DESCRIPTION OF THE PREFERRED EMBODIMENT

First embodiment

Figure 1:
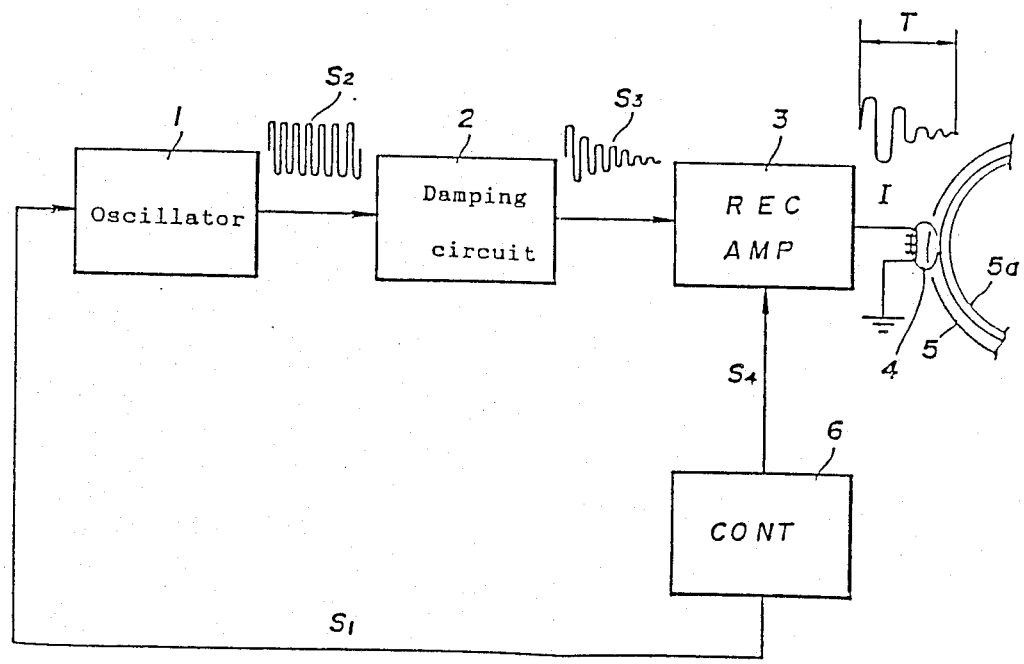
FIG. 1 is a block diagram showing a device which embodies a first erasing method according to the present invention.

FIG. 1 is a block diagram showing an erasing device of a first embodiment of the erasing method according to the present invention. Referring to FIG. 1, numeral 1 indicates an oscillator; numeral 2 indicates a damping circuit, numeral 3 indicates a recording amplifier; numeral 4 indicates a magnetic head; numeral 5 indicates a floppy disk such as a magnetic recording medium; and numeral 6 indicates a control circuit. When the oscillator 1 receives an oscillation control signal $S_1$ from the control circuit 6, the oscillator 1 oscillates and outputs a sinusoidal oscillation signal $S_2$. The frequency of the oscillation signal $S_2$ is higher than a recording frequency band (about 0 to 12 MHz) of the video signal, more specifically 14 MHz. The damping circuit 2 gradually dampens the oscillation signal $S_2$ to obtain a gradually dampened oscillation signal $S_3$. In this case, the time required for obtaining a sufficiently low level of the gradually-dampened oscillation signal $S_3$, that is a damping time, canbe determined relative to the rotation speed of the floppy disk 5. For the floppy disk 5 in a still camera system which rotates one turn in 1/60 second, the damping time is adequately determined as a length of time for 60 turns. The recording amplifier 3 is operated by a recording control signal $S_4$ from the control circuit 6, which amplifies the gradually-dampened oscillation signal $S_3$ to obtain an erasing current I. The initial amplitude level of the erasing current I is greater than an optimum recording current for the magnetic head 4. In this embodiment, the initial amplitude level of the erasing current I is to 100 mA p-p, which is 25% greater than the optimum recording current of 80 mA p-p for the magnetic head 4. For a magnetic disk in electronic still cameras, since, as specified in the standards, the spectra of signals to be recorded are distributed with a peak around 7 MHz, the optimum recording current is practically determined as a recording current value at which the reproduction output is at a maximum when recorded at a frequency of 7 MHz. Thus, the magnetic head 4 is applied with an erasing current I which has a higher frequency than the recording frequency band of the video signal. The erasing current's amplitude gradually-dampened from an initial amplitude level which is greater than the optimum recording current level for the magnetic head 4.

The first embodiment of the erasing method using the above-described device will now be described. For example, to erase the video signal recorded on a track 5a of the floppy disk 5 by the magnetic head 4, the floppy disk 5 is rotated, the track 5a is scanned by the magnetic head 4, and the magnetic head 4 is applied with the erasing current I. Since the initial amplitude level of the erasing current I is high, the track 5a is magnetically saturated with the erasing current I and the video signal is erased. Because the amplitude of the erasing current I is gradually dampened, the residual level of the erasing signal by the erasing current I and that of the entire band on the track 5a are gradually dampened. When the damping time T is 1 second or longer, the residual level is further decreased to a negligible small level. Even if a low level of the erasing signal remains, it is normally rewritten by a rewriting signal into a new spectrum.

Data of various experiments using the device shown in FIG. 1 will be shown. The track 5a to be erased is previously recorded with a test video signal for the evaluation of erasing rate and other experiments by applying the magnetic head 4 with signal currents having 80 mA p-p of a single frequency of 7 MHz and a single frequency of 1.25 MHz, the latter signal having a level of −18 dB with respect to the former signal level.

Figure 2:
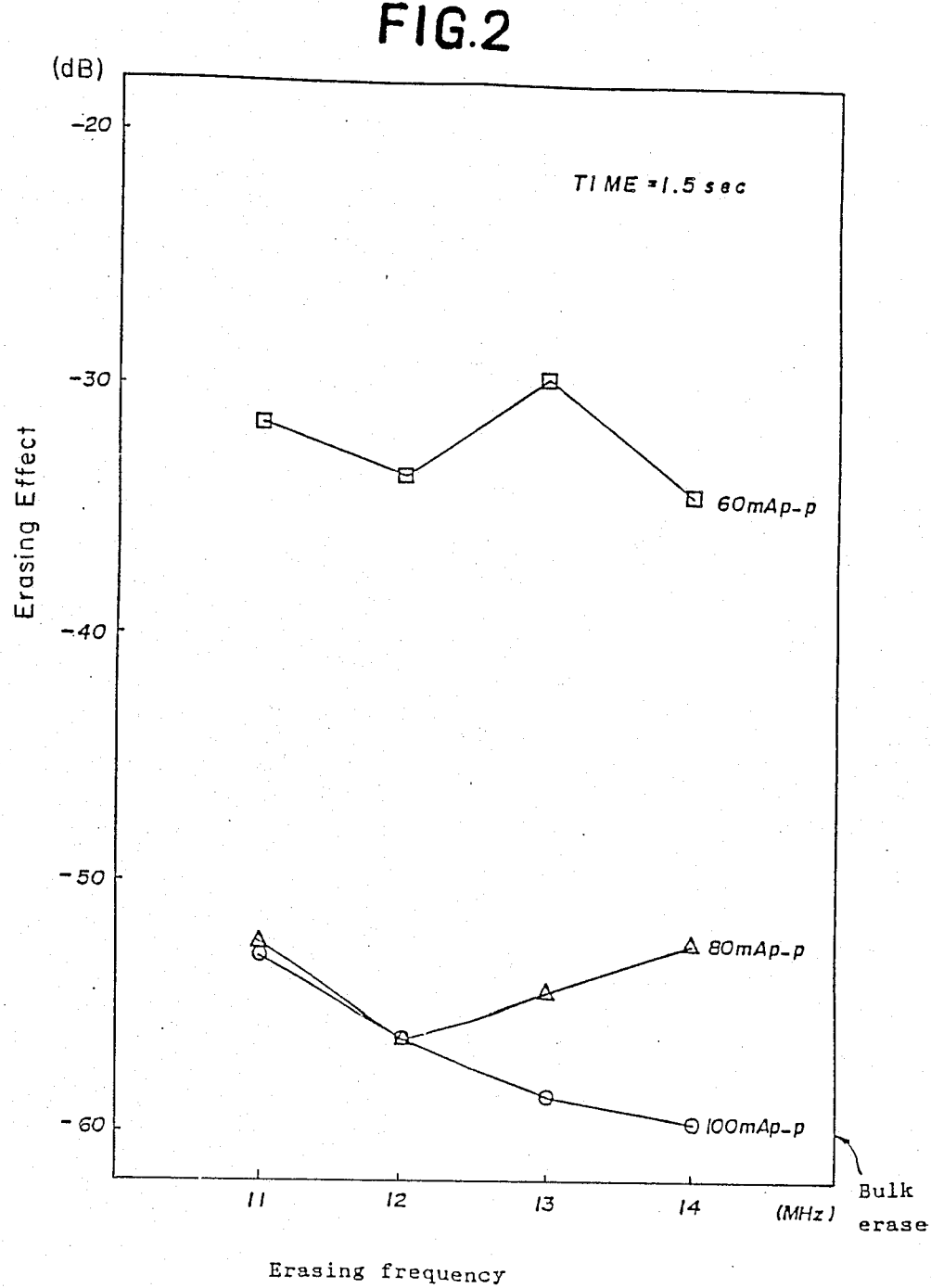
FIG. 2 through FIG. 4 are graphics showing data of the erasing rates of luminance signals when using the first erasing method according to the present invention.
Figure 3:
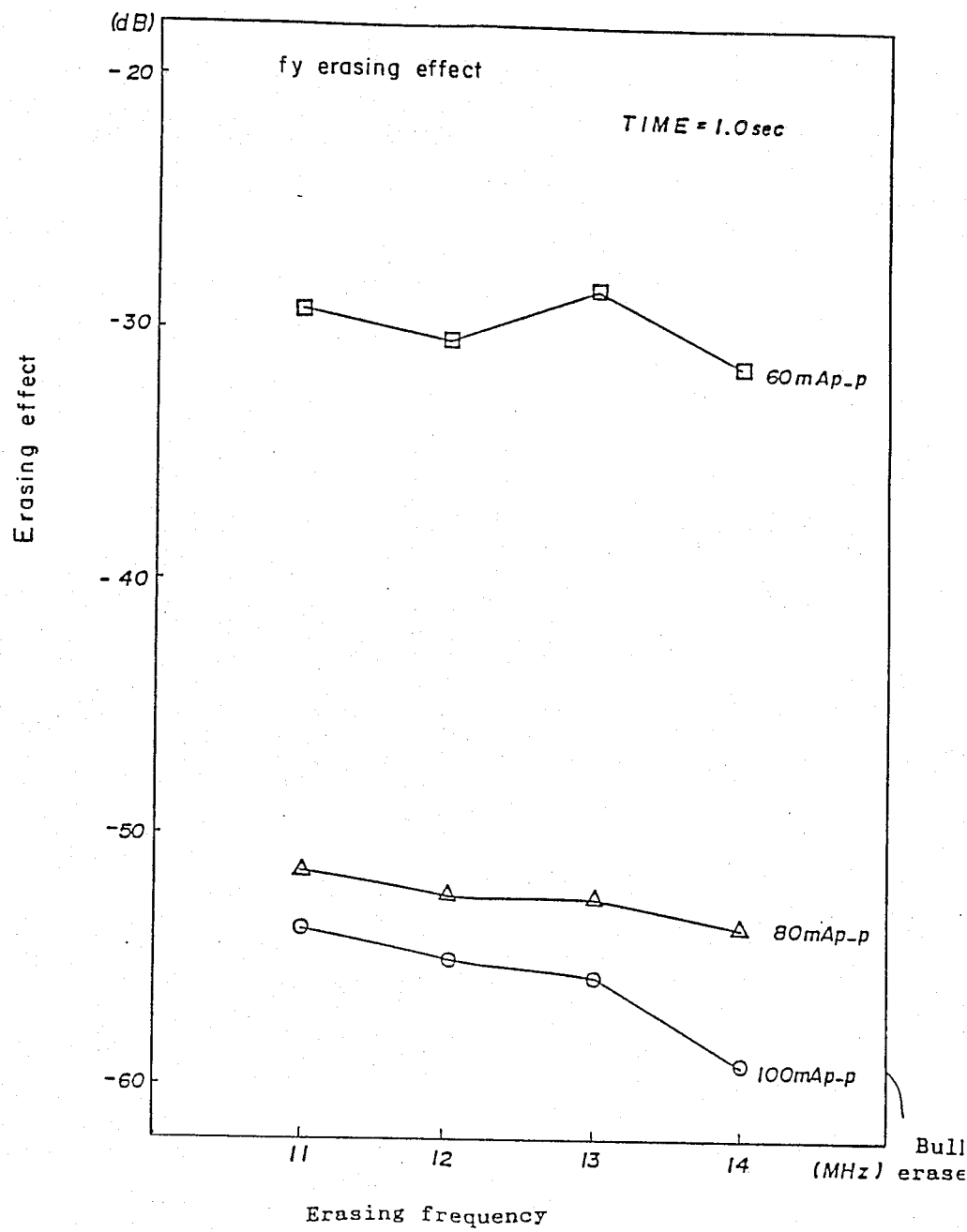
Figure 4:
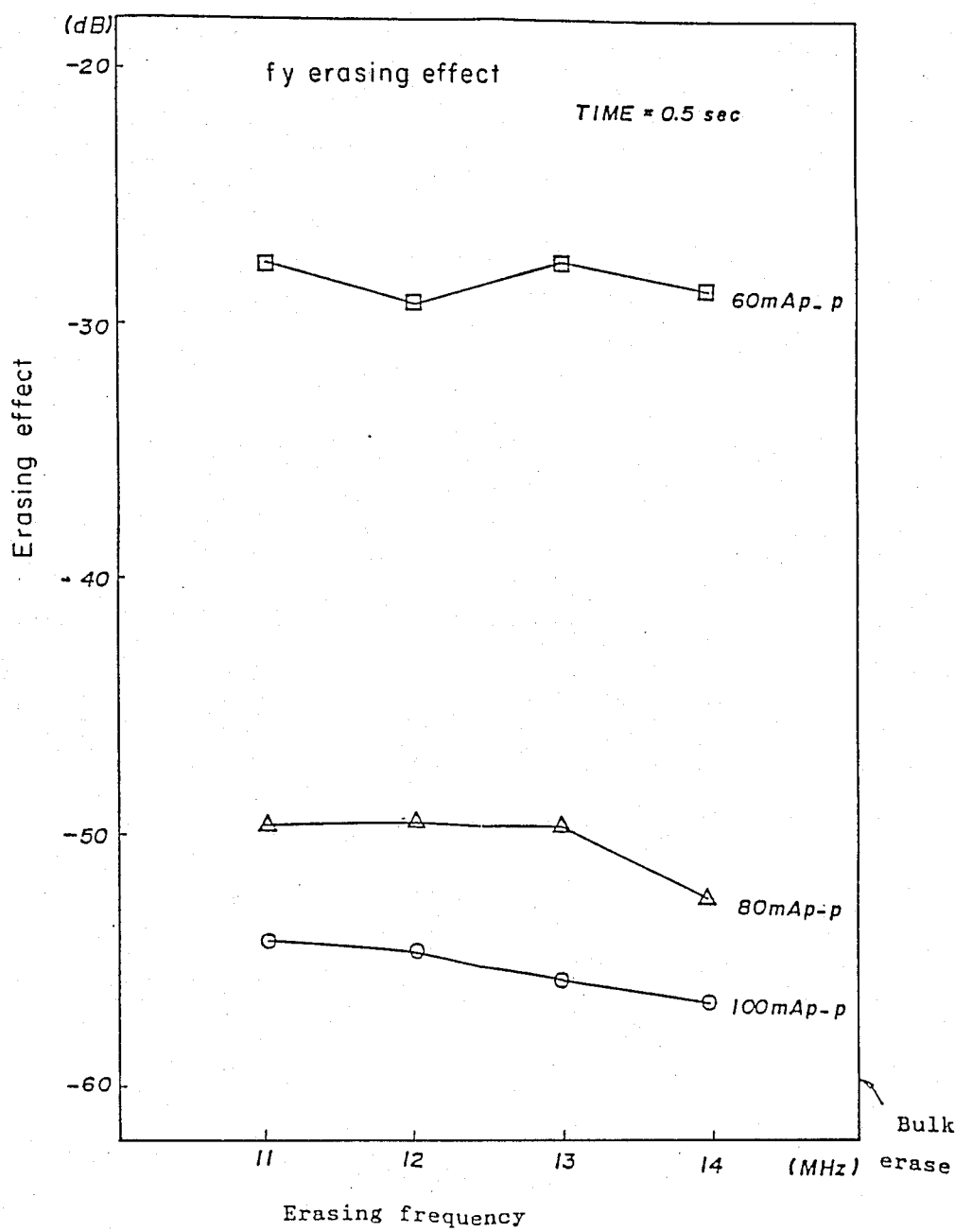

FIG. 2, FIG. 3, and FIG. 4 show erasing effects of a luminance signal $f_Y$ for different erasing currents I of 60 mA p-p, 80 mA p-p, and 100 mA p-p and different damping times of 1.5 second, 1.0 second, and 0.5 second, at various frequencies of the erasing current I. It can be seen from the figures that a greater erasing effects is obtained with a longer damping time, a higher frequency, and a greater erasing current value, and especially the erasing current value greatly affects the erasing effect. The erasing effect is approximately −30dB at an erasing current value of 60 mA p-p, whereas an erasing effect of over −50dB is obtained at erasing current values of over 80 mA p-p. An erasing current value of 100 mA at 14 MHz results in an erasing effect comparable to a bulk erase level (−60dB).

FIG. 5, FIG. 6, and FIG. 7 show erasing effects of a color signal $f_c$ for different erasing currents I of 60 mA p-p, 80 mA p-p, and 100 mA p-p and different damping times of 1.5 second, 1.0 second, and 0.5 second, at various frequencies of the erasing current I. It can be seen from the figures that as for the case of the luminance signal, the erasing current value has the largest influence. The erasing effect is approximate −10dB at an erasing current value of 60 mA p-p, approximately −20dB to −25dB for 80 mA p-p, and approximately −40dB for 100 mA p-p.

FIG. 8, FIG. 9, and FIG. 10 show residual levels for other frequencies other than the single spectra. These figures indicate the following. As for the erasing-current dependency, the residual level is not reduced at 60 mA p-p, whereas the residual level decreases either at 80 mA p-p or 100 mA p-p as the abovedescribed cases. As for the frequency dependency, the residual level decreases as the frequency increases. As for the damping-time dependency, the residual level is high at a damping time of 0.5 second, whereas it is low at 1.0 second and 1.5 second.

For the S/N ratio, the erasing method according to the present invention is compared with the bulk erase in the table below. For the erasing method according to the present invention, an erasing current of 14 MHz, 100 mA p-p, is dampened in 1.0 second.

TABLE

| | (S/N ratio in dB) | | |
|---|---|---|---|
| | Bulk erase | Present invention | Difference |
| Luminance | 48.7 | 48.3 | −0.4 |
| Chroma (AM) | 55.5 | 55.5 | 0.0 |
| Chroma (FM) | 45.7 | 45.5 | −0.2 |

As described above, it has been confirmed that the erasing method according to the present invention can provide erasing effects comparable to the bulk erase.

Second embodiment

Figure 11:
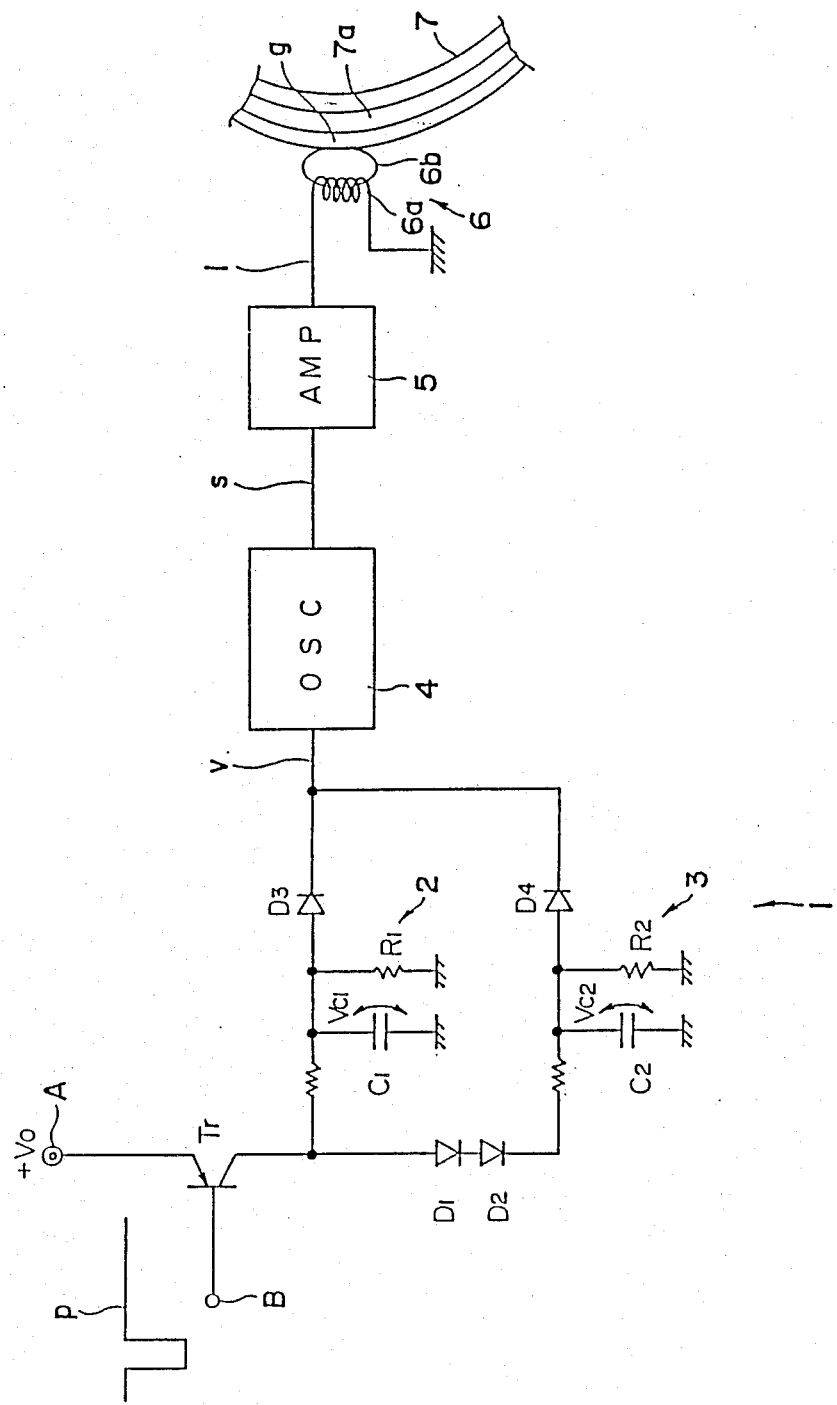
FIG. 11 is a circuit diagram of an erasing circuit which embodies a second erasing method according to the present invention.

FIG. 11 is a block diagram showing an erasing circuit of a second embodiment of the erasing method according to the present invention. Referring to FIG. 11, a damping circuit 11 has a time constant circuit 12 consisting of a capacitor $C_1$ and a resistor $R_1$; a time constant circuit 13 consisting of a capacitor $C_2$ and a resistor $R_2$; a transistor Tr having a switching function; diodes $D_1, ... D_2$ which all act as voltage-dropping resistors; and diodes $D_3$ and $D_4$ for signal selection. The time constant of the time constant circuit 12 is smaller than that of the time constant circuit 13. A terminal A is applied with a DC voltage $V_0$, and a terminal B is applied with a control pulse P. An oscillator 14, which generates an output proportional to DC voltage, is energized by the damping circuit 11 to oscillate and outputs an oscillation voltage S. The frequency of the oscillation voltage S is higher than the recording frequency band (approximately 0 to 12 MHz) of the video signal, more specifically it is set to 14 MHz. The oscillation voltage S is amplified by an amplifier 15 to obtain an erasing current I, which flows through a coil 16a of a magnetic head 16. The magnetic head 16 scans a floppy disk 17 as a rotary magnetic recording medium.

The second embodiment of the erasing method according to the present invention using the above-described erasing circuit will now be described. For example, to erase the video signal recorded on a track 17a of the floppy disk 17 by the magnetic head 16, the floppy disk 17 is rotated, the track 17a is scanned by the magnetic head 16, and the control pulse P is inputted to the terminal B of the damping circuit 11.

Figure 12:
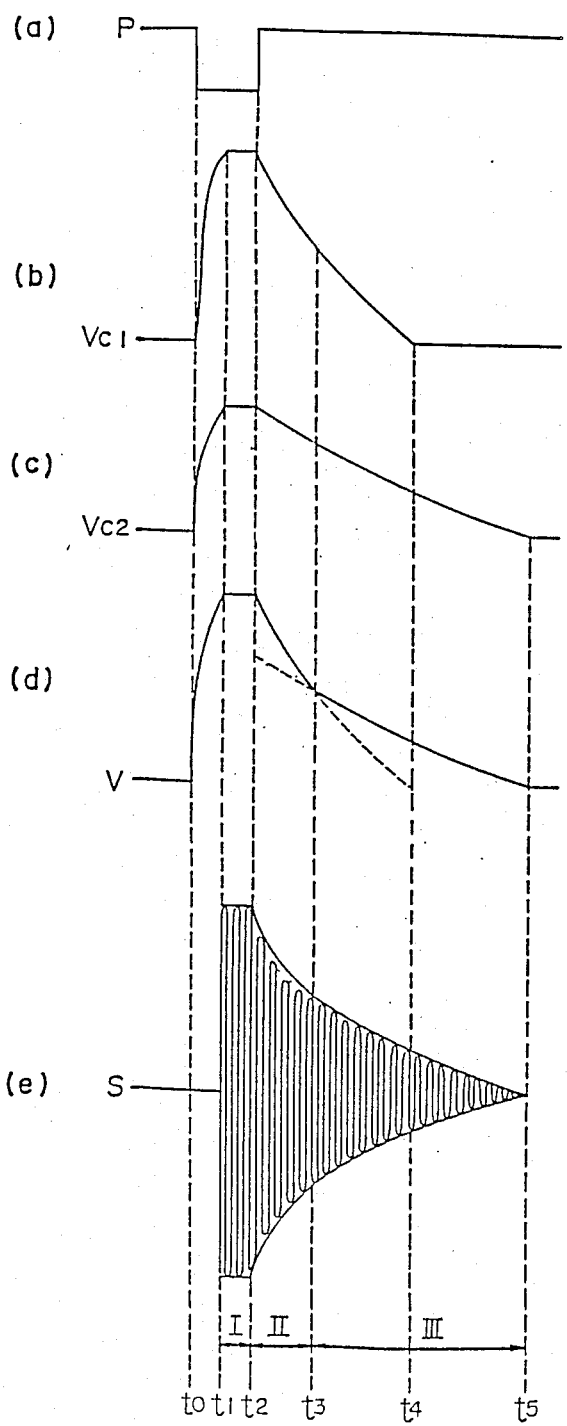
FIG. 12, (a)-(e), is a graphic showing waveforms of individual signals in the erasing circuit when using the second erasing method according to the present invention.

Operation after the input of the control pulse P will be described with reference to FIG. 11 and FIG. 12. At a falling edge of the control pulse P (time $t_0$ in FIG. 12), the transistor Tr becomes conductive and begins to charge the capacitors $C_1$ and $C_2$. The capacitors $C_1$ and $C_2$ and completely charged at time $t_1$. At the completion of the charging, a charge voltage $v_{c2}$ of the capacitor $C_2$ is lower by a difference in the voltage drop of the diodes $D_1, ... D_2$ than a charge voltage $v_{c1}$ for the capacitor $C_1$. After the completion of the charging, at a rising edge of the control pulse P (time $t_2$), the transistor Tr is shut off and the capacitors $C_1$ and $C_2$ begin to discharge. The charge voltage $v_{c1}$ of the capacitor $C_1$ rapidly decreases to zero at time $t_4$, whereas the charge voltage $v_{c2}$ of the capacitor $C_2$ gradually decreases to zero at time $t_5$. In this case, $v_{c1} > v_{c2}$ between time $t_2$ and time $t_3$, and $v_{c1} < v_{c2}$ after time $t_3$. An input voltage v to the oscillator 14, which is the higher of $v_{c1}$ or $v_{c2}$ whichever higher, is equal to the charge voltage $v_{c1}$ in periods I and II, and equal to the charge voltage $v_{c2}$ in a period III. As a result, the value of the input voltage v is constant in the period I, rapidly decreases in the period II, and gradually decreases down to zero in the period III. Ratios of the periods I, II, and III are 1 : 2 : 7.

The oscillator 14, when inputted with the input voltage v, outputs the 14 MHz oscillation voltage S having an amplitude level corresponding to the input voltage v (FIG. 12(e)). The erasing current I, which is the oscillation voltage S amplified by the amplifier 15, flows through the coil 16a of the magnetic head 16. In this case, the amplitude level of the erasing current I in the period I is higher than an optimum recording current for the magnetic head 16. In this embodiment, the amplitude level of the erasing current I in the period I is set to 100 mA p-p, which is 25% greater than the optimum recording current of 80 mA p-p for the magnetic head 16. Since, as specified in the standards for magnetic disks for electronic still cameras, the spectra of signals to be recorded are distributed with a peak around 7 MHz, the optimum recording current is practically determined as a recording current value at which the reproduction output is maximum when recorded at a frequency of 7 MHz. As for the case of the oscillation voltage S, the amplitude level of the erasing current I rapidly decreases in the period II, and gradually decreases in the period III.

Since the coil 16a of the magnetic head 16 is applied with the erasing current I as described above, an alternating magnetic field (14 MHz) with a magnitude corresponding to the amplitude level of the erasing current I is generated in a gap g of a core 16b. The video signal recorded on the track 17a is erased by the alternating magnetic field.

Figure 13:
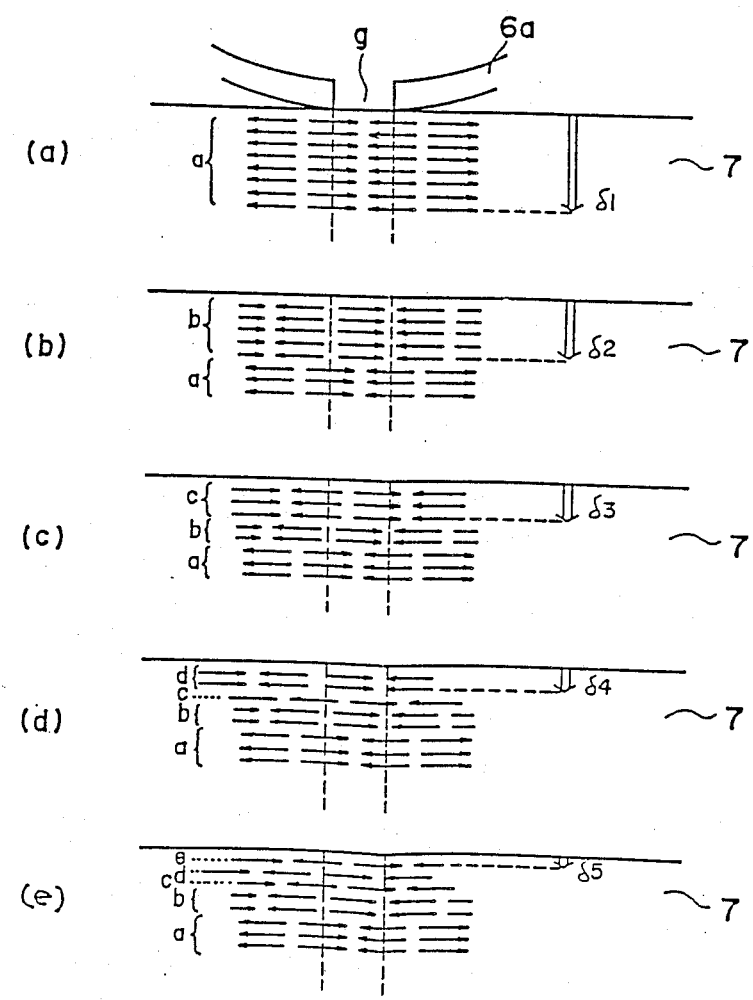
FIG. 13, (a)-e, is a schematic view showing the erasing condition of the second erasing method according to the present invention.

The erasing condition will be described with reference to FIG. 12(f) and FIG. 13. Since the erasing current I has a constant large amplitude in the period I, the magnetic material layer of the floppy disk 17 covering a portion from the surface to a depth of $\delta_1$ (FIG. 13(a)) can be recorded with a 14-MHz erasing signal a (indicated by arrows in FIG. 13) by the alternating magnetic field, thereby erasing the video signal. Thus, by scanning the track 17a a plurality of times by the magnetic head 16, every point on the track 17a is exposed to the strong magnetic field, and the original video signal is rewritten with the erasing signal.

In the period II, the amplitude of the erasing current I rapidly decreases. As shown in FIG. 13(b), at a point of time in the initial stage of the period II, an erasing signal b can be recorded onto the recording medium a depth of $\delta_2$, and the previous erasing signal a remains unerased in the deeper layer. Regarding a given point on the floppy disk 17, the point is magnetized every time it passes through the gap g with a phase of the erasing current I at that time. Thus, normally the phase of the erasing signal b is shifted from the phase of the erasing signal a. At a point of time in the final stage of the period II, as shown in FIG. 13(c), an erasing signal c can be recorded down to a depth of $\delta_3$, and the previous erasing signals a and b remain unerased in the deeper layer. Moreover, the phases of the erasing signals a, b, and c are shifted from each other.

In the period III, the amplitude of the erasing current I gradually decreases. At a point of time in the initial stage of the period III, as shown in FIG. 13(d), an erasing signal d can be recorded down to a depth of $\delta_4$, and the previous erasing signals a, b, and c remain unerased with different phases in the deeper layer. Further, at a point of time in the final stage of the period III, as shown in FIG. 13(e), an erasing signal e can be recorded down to a depth of $\delta_5$, and the previous erasing signals a, b, c, and d remain unerased with different phases in the deeper layer.

Ultimately, the area that can be recorded becomes shallower as the amplitude of the erasing current I decreases, and the erasing signals with different phases are recorded in turn from the deeper layer. Moreover, since the period III with a smaller amplitude is longer than the period II with a greater amplitude, the rate of phase shift of the erasing signal in a unit of thickness of the magnetic material layer (degree of random phase) is greater in the upper layer of the magnetic material.

Therefore, after the erasing current I is zero, even when the magnetic head is set to the reproduction mode to scan the track 17a, the 14-MHz erasing signals a through e cancel each other to decrease the reproduction level of the erasing signal in the magnetic head 16. In particular, in the surface layer of the floppy disk 17 which greatly affects the reproduction output signal, the phases of the erasing signal are highly random, thereby suppressing the reproduction of the erasing signal. Thus, perfect erasing of the video signal is accomplished. Moreover, the period III which greatly contributes to the erasing has a large proportion, thereby assuring positive erasing even when the total erasing time is short.

Although the previously-described prior art erasing method uses an exponentially-decreasing erasing current, the erasing current can also be decreased linearly.

Third embodiment

Figure 14:
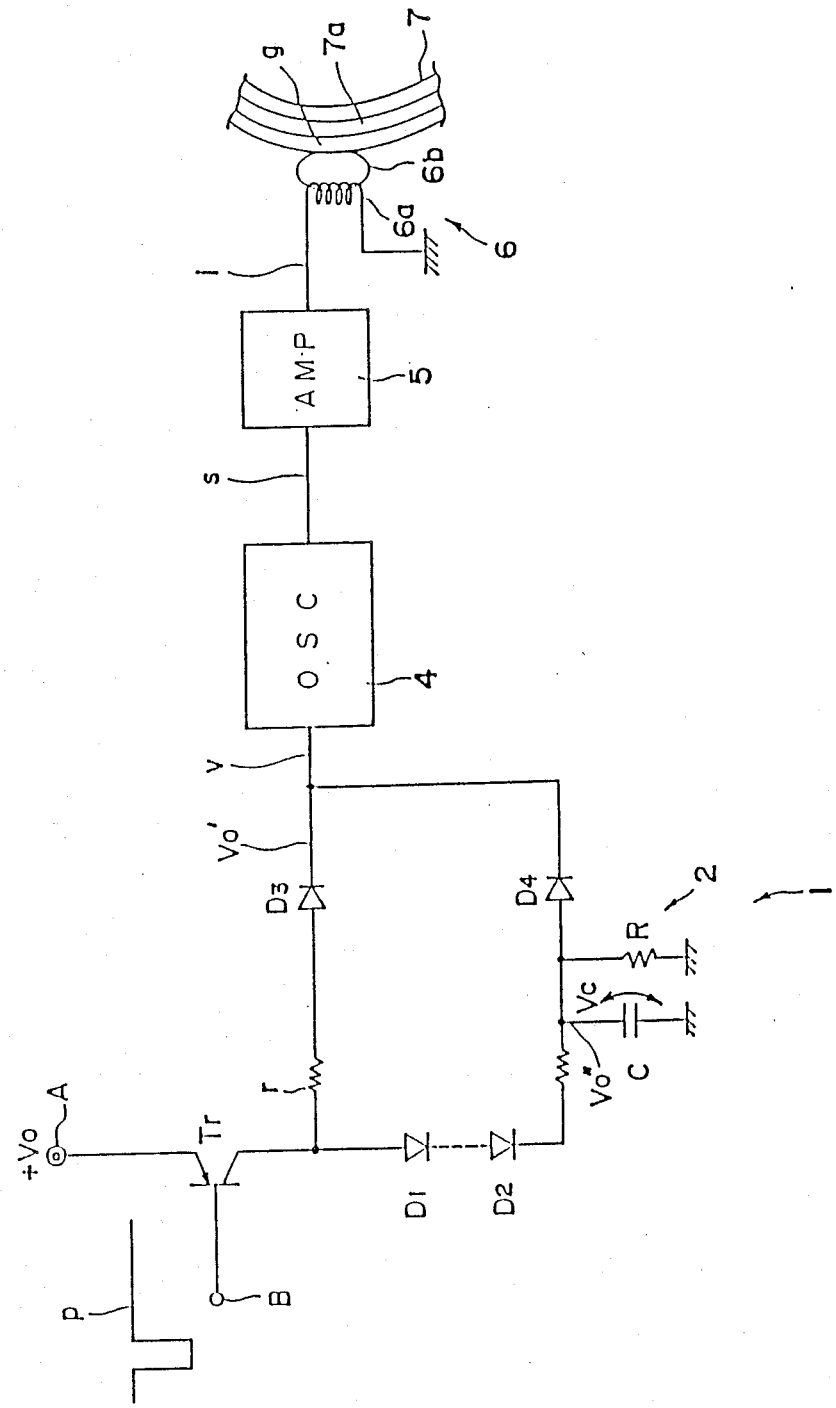
FIG. 14 is a block diagram showing an erasing circuit which embodies the erasing method according to the present invention.

FIG. 14 is a block diagram showing an erasing circuit of a third embodiment of the erasing method according to the present invention. Referring to FIG. 14, a damping circuit 21 has a time constant circuit 22 comprising a capacitor C and a resistor R; a resistor r; a transistor Tr having a switching function; diodes $D_1, \ldots D_2$ which all act as voltage-dropping resistors; and diodes $D_3$ and $D_4$ for signal selection. A terminal A is applied with a DC voltage $V_0$ and a terminal B is applied with a control pulse P. An oscillator 24, which generates an output amplitude proportional to the applied DC voltage, is energized by the damping circuit 21 to oscillate and outputs an oscillation voltage S. The frequency of the oscillation voltage S is higher than the recording frequency band (approximately 0 to 12 MHz) of the video signal, more specifically, 14 MHz. The oscillation voltage S is amplified by an amplifier 25 to obtain an erasing current I, which flows through a coil 26a of a magnetic head 26. The magnetic head 26 scans a floppy disk 27 as a rotary magnetic recording medium. The magnetic head 26 is a thin-film-type head for electronic still video use. The floppy disk 27 rotates at a speed of 60 revolutions per second.

The third embodiment of the erasing method according to the present invention using the above-described erasing circuit will now be described. For example, to erase the video signal recorded on a track 27a of the floppy disk 27 by the magnetic head 26, the floppy disk 27 is rotated, the track 27a is scanned by the magnetic head 26, and the control pulse P is inputted to the terminal B of the damping circuit 21.

Figure 15:
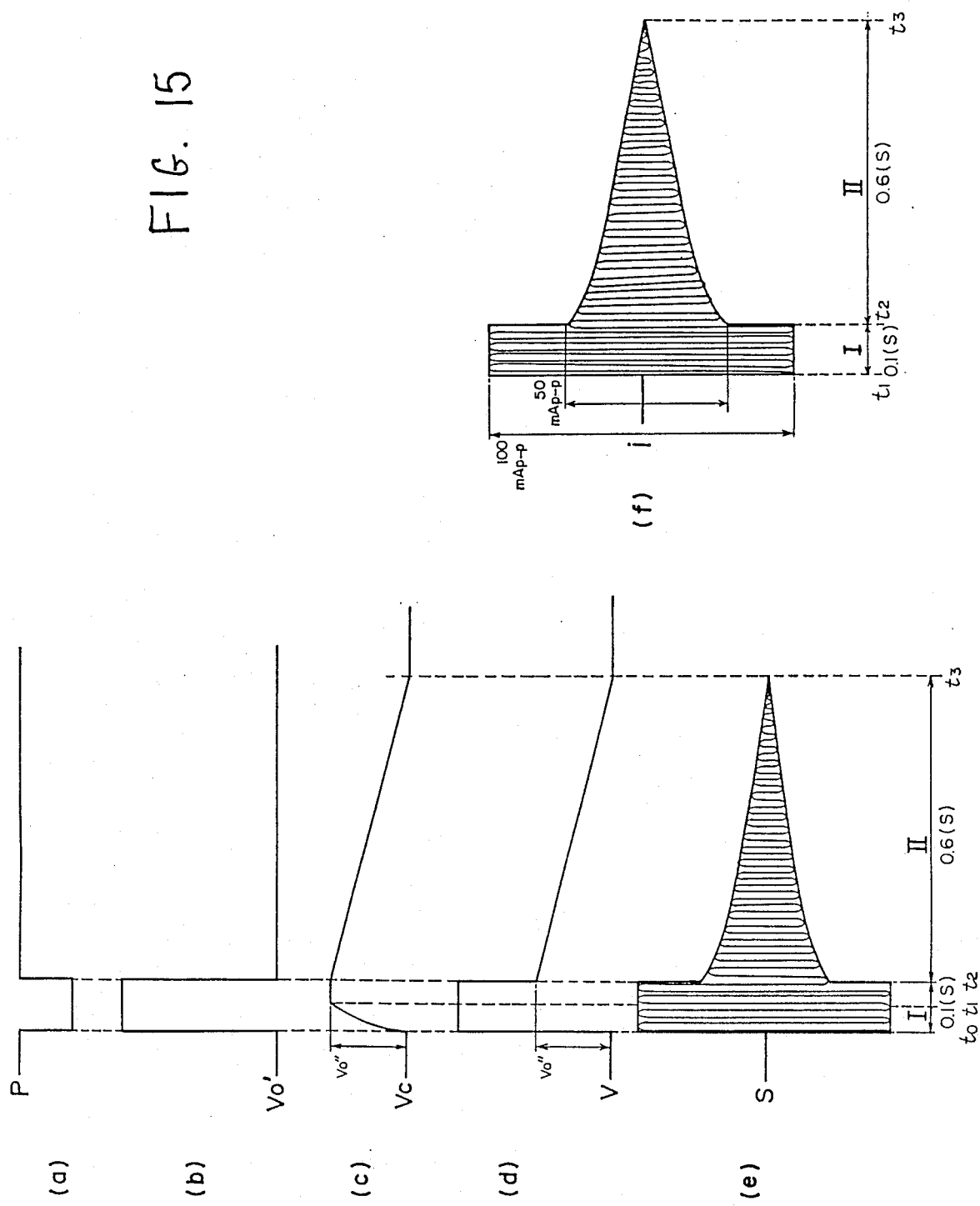
FIG. 15, (a)-(e), is a graphic showing waveforms of individual signals in the erasing circuit.

Operation after the input of the control pulse P will be described with reference to FIG. 14 and FIG. 15. At a falling edge of the control pulse P (time $t_0$ in FIG. 15), the transistor Tr becomes conductive; an input voltage V having a voltage value $V_0'$ is inputted to the oscillator 24, and the capacitor C begins to be charged. The voltage value $V_0'$ is the difference of a voltage drop in the transistor Tr and the resistor r subtracted from the voltage value $v_0$. Charging the capacitor C is completed at time $t_1$. In this case, at the completion of the charging, a charge voltage Vc of the capacitor C is one-half the voltage value $V_0'$. (where $\frac{1}{2}V_0' = V_0''$). After the completion of the charging, at a rising edge of the control pulse P (time $t_2$), the transistor Tr is shut off and the capacitor C begins to discharge. The charge voltage Vc begins to gradually decrease exponentially at time $t_2$ and reaches zero at time $t_3$. As a result, the value of the input voltage V is constant at $V_0'$ during an initial period I ($t_0-t_2$); equal to Vc during a subsequent period II ($t_2-t_3$); and gradually decreasing from $V_0''$ to zero exponentially. In this embodiment, the initial period I has a length of 0.1 seconds, and the subsequent period II has a length of 0.5 seconds. Alternatively, the charge voltage Vc may be decreased linearly in the subsequent period II by adding a circuit which discharges the current constantly.

Figure 16:
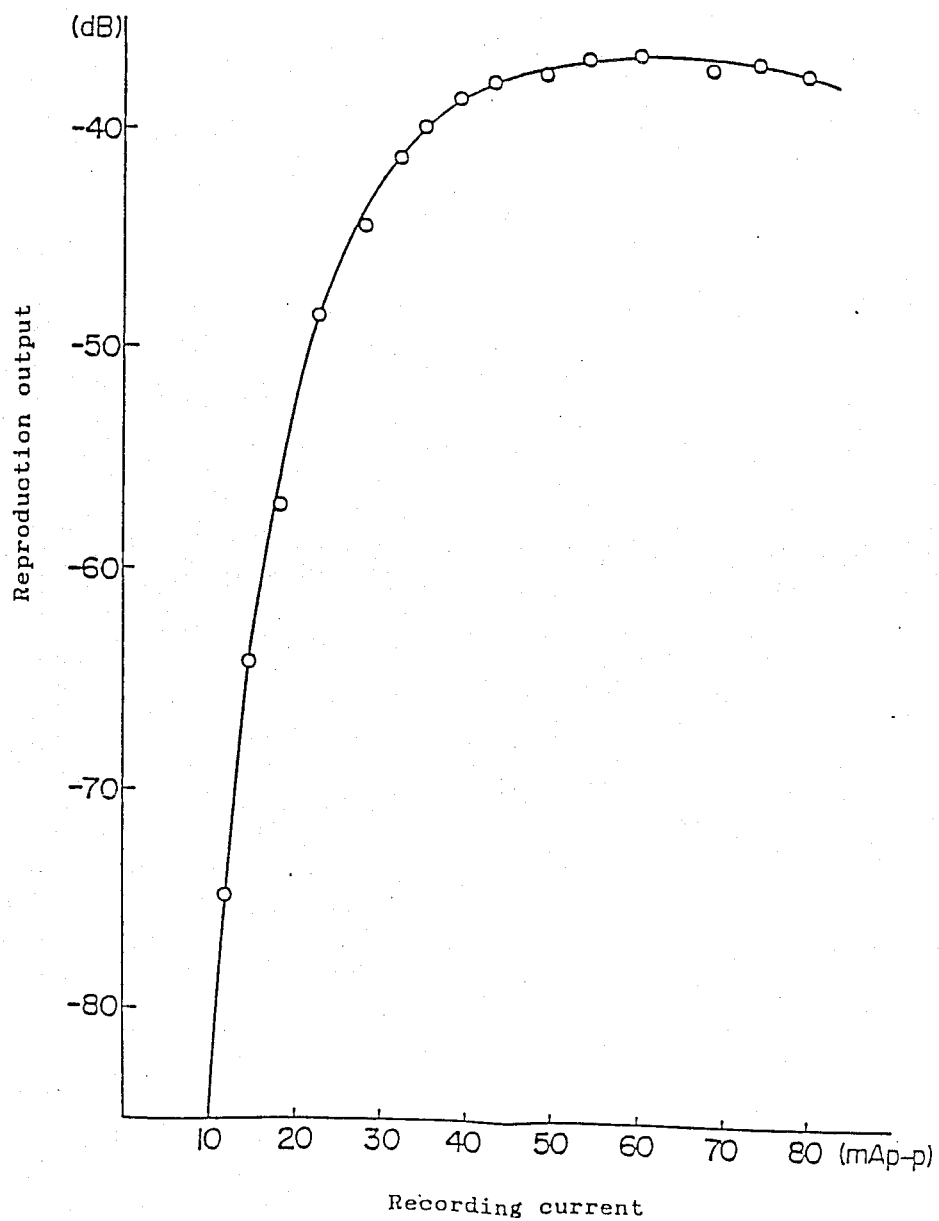
FIG. 16 is a graphic showing the relationship between the recording current and the reproduction output of the magnetic head at the erasing frequency (14 MHz)

The oscillator 24, when inputted with the input voltage v, outputs the 14 MHz oscillation voltage S having an amplitude level corresponding to the input voltage v (FIG. 14(e)). The erasing current I, which is based on the oscillation voltage S amplified by the amplifier 25 (FIG. 15(f)), flows through coil 26a of the magnetic head 26. In this case, the amplitude level of the erasing current I in the period I (corresponding to $V_0'$) is higher than 1.25-times, the optimum recording current for the magnetic head 26. In this embodiment, the amplitude level of the erasing current I in the period I is set to 100 mA p-p, which is 25% greater than the optimum recording current of 80 mA p-p for the magnetic head 26. The initial value of the erasing current I in the subsequent period II is set at 50 mA p-p. This 50 mA p-p is a current value ($V_0''$) corresponding to the level where the recording current - reproduction output response of the magnetic head 26 (FIG. 16) at the erasing frequency begins to saturate. Since, as specified in the standards for magnetic disks for electronic still cameras, the spectra of signals to be recorded are distributed with a peak around 7 MHz, the optimum recording current is practically determined as a recording current value at which the reproduction output is maximum when recorded at a frequency of 7 MHz.

Since the coil 26a of the magnetic head 26 is applied with the erasing current I as described above, an alternating magnetic field (14 MHz) with a magnitude corresponding to the amplitude level of the erasing current I is generated in a gap g of core 26b. The video signal recorded on the track 27a is erased by the alternating magnetic field. Thus, during the initial period I, the track 27a to be erased is saturated with the alternating magnetic field having a large amplitude to rewrite the recorded video signal to the 14 MHz signal, thereby removing the spectral components of the video signal. In the subsequent Period II, the alternating magnetic field having gradually decreasing amplitude reduces the residual magnetism particularly in the luminance signal band and, at the same time, reduces the level of the erasing signal I recorded on the track 27a. Thus, the video signal is erased.

In this embodiment the initial period I is 0.1 second and the subsequent period II is 0.6 second. However, the initial period I may be a length of time required for a point on the track 27a to be erased to pass 30 or more times relatively over the gap g of the magnetic head 26, that is 1/60×30=0.5 seconds or more.

Further, in this embodiment the initial period I with the erasing current I of 100 mA p-p in amplitude is immediately followed by the subsequent period II where the erasing current I gradually decreases in amplitude from 50 mA p-p to zero. However, the beginning of the subsequent period II may be delayed in time from the end of the initial period I. In the delay time between the periods I and Ii, the current may be zero or a 14 Mhz current gradually decreasing in amplitude from 100 mA p-p to 50 mA p-p.

Data of various experiments using the device shown in FIG. 14 will be shown. The track 27a to be erased is previously recorded with a test video signal for the evaluation of erasing rate and other experiments by applying the magnetic head 26 with signal currents of 80 mA p-p having a single frequency of 7 Mhz and a single frequency of 1.25 MHz, the latter signal having a level of −18dB with respect to the former signal level.

Figure 17:
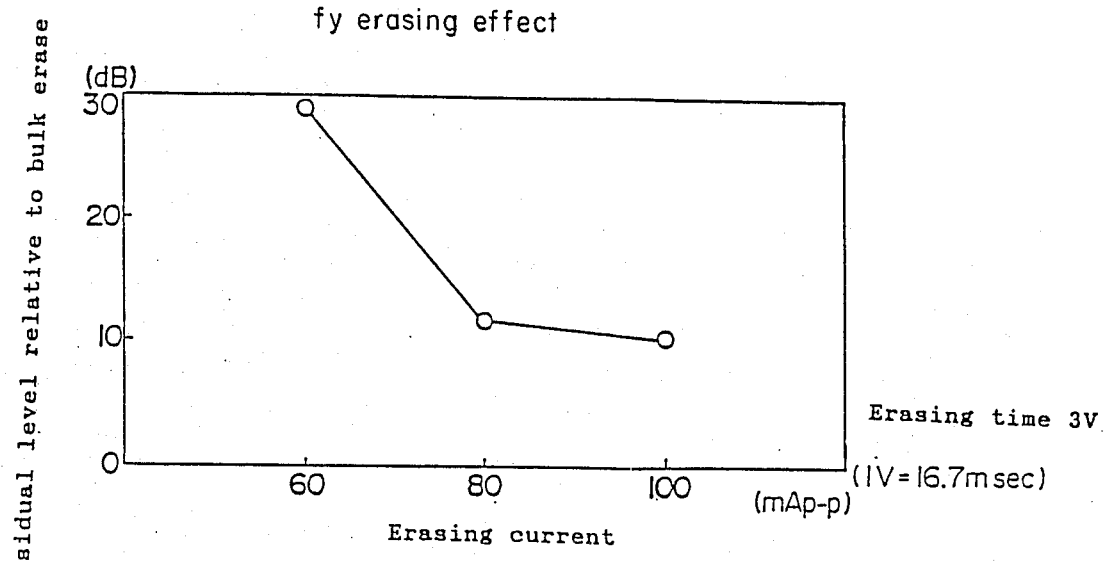
FIG. 17 is a graphic showing the erasing rate of the luminance signal with various erasing current values.
Figure 18:
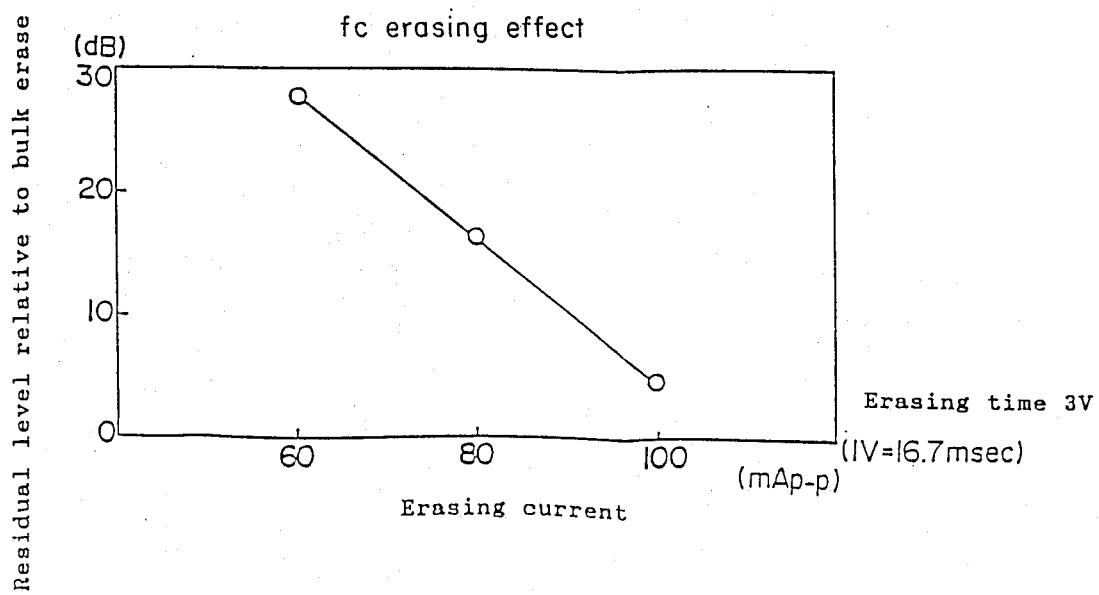
FIG. 18 is a graphic showing the erasing rate of the color signal with various erasing times.

FIG. 17 and FIG. 18 show erasing effects of luminance signal $f_Y$ and color signal $f_c$ for different erasing currents i of 60 mA p-p, 80 mA p-p, and 100 mA p-p at a frequency of 14 MHz flown for three vertical scanning periods. One vertical scanning cycle (1V) is approximately $16.7 \times 10^{-3}$ seconds, which corresponds to a length of time required for one turn of the floppy disk 27. It can be seen from the FIG. 17 that when the erasing current value is 80 mA p-p or greater, the residual level of the luminance signal $f_Y$ is approximately same as that for the bulk erases. It can also be seen from FIG. 18 that when the erasing current value is 100 mA p-p or greater, the residual level of the color signal $f_c$ is as low as that for the bulk erase. Based on the above-described results, in this embodiment the amplitude of the erasing current I in the initial period I is set to 100 mA p-p.

Figure 19:
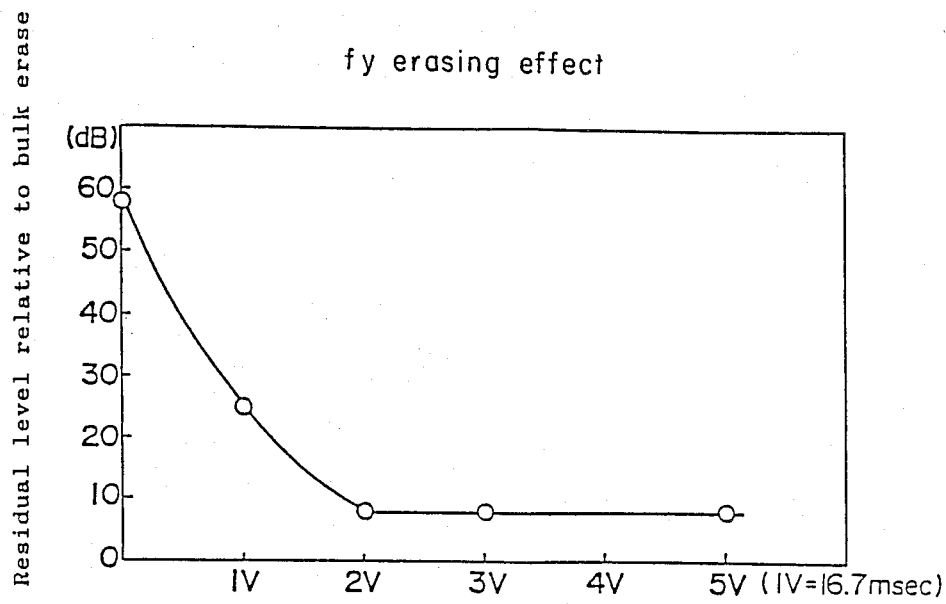
FIG. 19 ia a graphic showing the erasing rate of the luminance signal with various erasing times.
Figure 20:
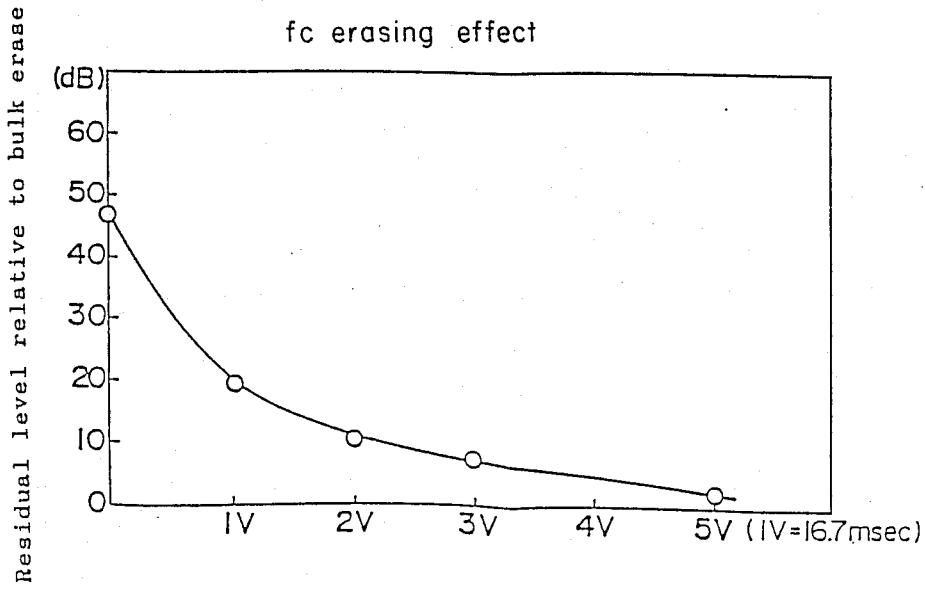
FIG. 20 is a graphic showing the erasing rate of the color signal with various erasing times.

FIG. 19 and FIG. 20 show erasing effects of luminance signal $f_Y$ and color signal $f_c$ for an erasing current I of 100 mA p-p at a frequency of 14 MHz with various erasing time. It can be seen from the figures that when the erasing time is equal two vertical scanning cycles (2V) or more, the residual levels of the luminance signal $f_Y$ and the color signal $f_c$ are comparable to those for the bulk erase. Thus, as shown in FIG. 15(f), in this embodiment the length of the initial period I is three vertical scanning cycles (=0.05 second) or more, in other words, a length of time required for three or more turns of the floppy disk 27, which is actually set to 0.1 seconds for positive erasing.

Figure 21:
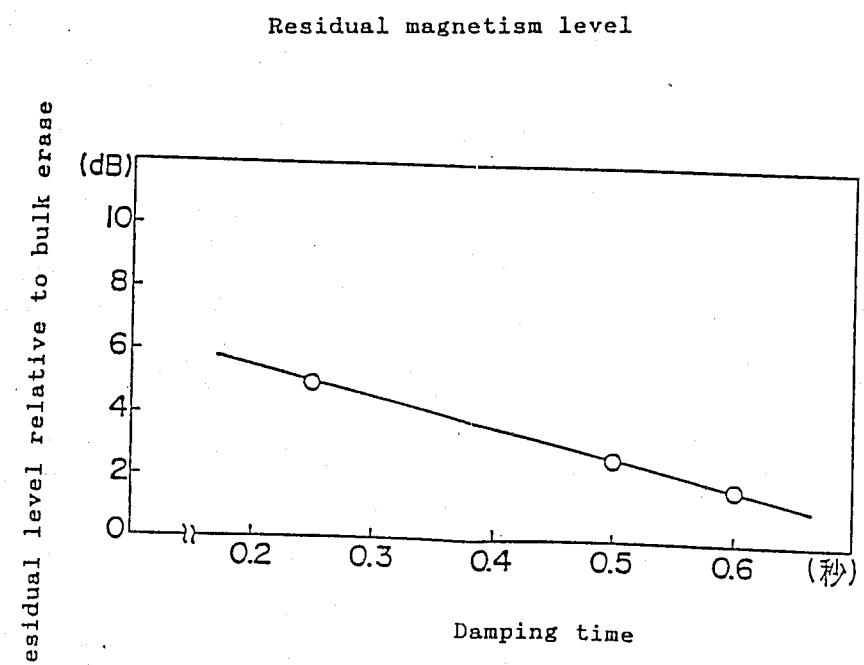
FIG. 21 is a graphic showing the residual magnetism level.

FIG. 21 shows the residual levels for erasing current I gradually decreasing from 50 mA p-p to zero with various damping time. It can be seen from the figure that when the damping time is 0.5 seconds or more, that is the time required for 30 or more turns of the floppy disk 27, the residual level is extremely low. Therefore, in this embodiment, the length of the time of the subsequent period II is set to 0.6 seconds for positive erasing, as shown in FIG. 15(f).

What is claimed is:

1. An erasing method used in a magnetic recording device for erasing a video signal written by a magnetic head onto a track of a rotary magnetic recording medium, comprising the steps of:

scanning said track to be erased by said magnetic head;

applying an erasing current to said magnetic head, said erasing current having a frequency higher than a recording frequency band of said video signal and having a constant amplitude level of approximately 1.25 or more times an optimum recording current level for said magnetic head, said constant amplitude level being applied for an initial period having a length of time required for a point on said track to pass 3 times or more over a gap of said magnetic head;

decreasing the level of said erasing current abruptly from said constant amplitude level to said optimum recording current level after said initial period; and decreasing gradually said erasing current from said optimum recording current level to zero for a subsequent period following said initial period, said subsequent period having a length of time required for a point on said track to pass 30 times or more over said gap of said magnetic head.

2. An erasing method used in a magnetic recording device for erasing a video signal written by a magnetic head on a track of a rotary magnetic recording medium, comprising the steps of:

scanning said track to be erased by said magnetic head;

applying an erasing current to said magnetic head, said erasing current having a frequency higher than a recording frequency band of said video signal and having a constant amplitude level of approximately 1.25 or more times an optimum recording current level for said magnetic head, said constant amplitude level being applied for an initial period having a length of time required for a point on said track to pass 3 times or more over a gap of said magnetic head;

decreasing the level of said erasing current abruptly from said constant amplitude level to said optimum recording current level; and decreasing gradually the level of said erasing current from said optimum recording current level to zero for a subsequent period beginning after a time delay from which follows completion of said initial period, said subsequent period having a length of time required for a point on said track to pass 30 times or more over said gap of said magnetic head.

* * * * *